United States Patent Office 2,844,615
Patented July 22, 1958

2,844,615
PROCESS FOR MAKING COMPLEX COMPOUNDS FROM ALUMINIUM HYDROCARBONS AND ALKALI FLUORIDES

Karl Ziegler and Roland Köster, Mulheim (Ruhr), and Herbert Lehmkuhl, Oberhausen-Sterkrade, Germany, assignors to Karl Ziegler, Mulheim (Ruhr), Germany, a corporation No Drawing. Application September 9, 1953
Serial No. 379,294

Claims priority, application Germany September 26, 1952

16 Claims. (Cl. 260—448)

The invention relates to the production of complex compounds from aluminium hydrocarbons and alkali fluorides the formula of which is $$[Al(R_2R')]MeF$$

or $$[Al(R_2R')]_2MeF$$

or mixtures of these compounds, all of which fall under the common formula $$[Al(R_2R')]_xMeF$$

wherein R designates a saturated aliphatic or aromatic residue, R' a saturated aliphatic or aromatic residue or a hydrogen atom, Me an alkali metal and $x$ 1 or 2. The two limit compounds of the formulas given contain aluminium hydrocarbon and alkali fluoride in the proportion of 1:1 and 2:1 respectively. These compounds are often insoluble or difficult to dissolve in aluminium hydrocarbon and also in hydrocarbons. As a rule, however, the two types of compounds can be intermixed as desired, with the result that the compound formation between aluminium hydrocarbons and alkali fluorides can occur in all quantitative proportions between 1:1 and 2:1.

The new compounds are produced by the conversion of aluminium hydrocarbons with alkali fluorides. The limit compounds or their mixtures which are represented by the formulas given, are obtained according to the selection of the quantitative proportion between the aluminium hydrocarbons on the one hand and the alkali fluorides on the other hand.

As aluminium hydrocarbons, aliphatic aluminium compounds, such as aluminium trimethyl, aluminium triethyl and aluminium tripropyl come into question on the one hand and aromatic aluminium compounds such as aluminium triphenyl, on the other hand. Finally, aluminium compounds can also be converted with alkali fluorides which contain a hydrogen atom in addition to two organic residues, for example diethyl aluminium hydride.

For producing the complex potassium aluminium triethyl fluorides, finely pulverized and dried potassium fluoride is introduced into 1 mole of aluminium triethyl while excluding the air, heating to about 130° C. and stirring. The fluoride dissolves and a fluid solution of the complex compound if formed which, on cooling, solidifies in crystalline form at 45 to 50° C. and also again melts when heated to this temperature. This compound corresponds to the formula $$Al(C_2H_5)_3KF$$

and in pure state has a melting point of 56 to 58° C.

If additional quantities of aluminium triethyl are added to the fluid solution of this compound under nitrogen, the melting point rises although the added aluminium triethyl is a liquid which only crystallizes at a temperature far below 0° C. The highest melting point of 120° C. is attained when exactly one additional mole of aluminium triethyl has been added. If the solution, after solidifying and being pulverized in a nitrogen atmosphere, is extracted for a time with pentane and then again crystallized out in nitrogen from hot benzol, colorless crystals having a melting point of 127 to 129° C. and exactly the composition $[Al(C_2H_5)_3]_2KF$ separate from the benzol solution on cooling. The above described compounds composed of 1 mole aluminium triethyl to 1 mole potassium fluoride or 2 moles aluminium triethyl to 1 mole potassium fluoride can be intermixed as desired in melted state so that an uninterrupted series of mixture phases is obtained within the limits wherein the proportions of aluminium triethyl and potassium fluoride are equal to 1:1 and 2:1 respectively. All these compounds and mixture phases are characterized in that therein the vapor pressure of the aluminium triethyl is much lower than in pure aluminium triethyl. Only in a vacuum under extreme conditions is it possible to distill off aluminium triethyl especially from the 2:1 compound.

In the system sodium fluoride-aluminium triethyl the conditions are entirely similar. If 1 mole of finely pulverized and dried sodium fluoride is introduced into 1 mole of aluminium triethyl with exclusion of air, while heating to about 130° C. and stirring, the compound obtained is $$Al(C_2H_5)_3NaF$$

with a melting point of 64 to 66° C. If, in fundamentally the same manner, 2 moles of aluminium triethyl are taken to 1 mole of sodium fluoride, the compound $$[Al(C_2H_5)_3]_2NaF$$

is obtained which is liquid and is characterized in that it is very slightly soluble in aluminium triethyl and aliphatic hydrocarbons, but can be mixed with many aromatic hydrocarbons, for example toluol. Therefore if sodium fluoride is introduced into surplus aluminium triethyl under heat of say 120° C., the fluoride immediately goes into solution and two liquid layers soon form, the lower, oily layer being composed of aluminium triethyl and sodium fluoride in a proportion of exactly 2 to 1. If further quantities of sodium fluoride are added, the lower layer increases continuously. The mixture becomes a single phase mixture the moment the proportion of aluminium triethyl to sodium fluoride is equal to 2 to 1 in the entire mixture. If still more sodium fluoride is added, it continues to go into solution until the proportion between the aluminium triethyl and sodium fluoride has reached 1 to 1. Any further quantities of sodium fluoride added remain undissolved. In an analogous way the compound having the formula $$Al(C_3H_7)_3NaF$$

can be produced from aluminium tripropyl and sodium fluoride and melts at 55° C. This simple process of production does not attain its object in cases in which the complex compounds of the aluminium hydrocarbons are particularly difficult to dissolve in alkali fluoride and have a high melting point, as is the case with, for example, potassium aluminium trimethyl fluoride. It is advisable in this case to grind a solution of the aluminium trialkyl in a neutral solvent, for example a hydrocarbon, with alkali fluoride in a ball mill with the exclusion of air. The formation of the complex compound is noticeable in that the dissolved aluminium gradually disappears from the hydrocarbon and enters the stable base element of the complex compound. When using aluminium triethyl and sodium fluoride the compound $Al(CH_3)_3NaF$ is obtained which melts at a temperature far above 200° C. By this process complex compounds of alkali fluoride can also be easily produced in which individual hydrocarbon residues are replaced by hydrogen, for example diethyl aluminium hydride.

Compounds, in which not all three valences of the aluminium are saturated against hydrocarbon residues or hydrogen, for example ethoxy-diethyl-aluminium with the formula $C_2H_5OAl(C_2H_5)_2$ do not form any complex compounds with alkali fluorides. Aluminium hydrocarbons, in which individual hydrocarbon residues are replaced by chlorine or bromine, also do not come into question for complex formation because they, according to copending patent application 370,655 of Karl Zeigler and Roland Koster, filed July 27, 1953, react with alkali fluoride to form aluminium fluoride hydrocarbons. The new complex compounds obtained according to the invention are very stable. It is not very easy to split them up into their components. Frequently they can be completely decomposed by heating. Splitting up is only possible in many cases by heating in a vacuum or high vacuum.

The alkali fluoride complex compounds of the aluminium hydrocarbons are frequently more stable than the known molecular compounds of the aluminium hydrocarbons with ethers, thioethers or tertiary amines. Consequently the complex compounds can also be produced from these molecular compounds, the ether or the thioether or the tertiary amine being separated and can be distilled off.

If, for example, 3 grms. of sodium fluoride are added to 14 grms. of aluminium tri-isobutyletherate and the mixture is heated to 120° C. and stirred, the sodium fluoride dissolves. If evacuation is now carried out, introducing a low cooled condenser, 3½ grms. of ether are distilled off in the condenser leaving the new complex compound $[Al(C_4H_9)_3]NaF$ which crystallizes in the cold and can be again melted at 40 to 50° C.

In the foregoing the new complex compounds with aluminium trialkyls have been described at great length; yet aluminium triaryls, such as aluminium triphenyl, also form similar compounds. Thus sodium fluoride dissolves easily in molten aluminium triphenyl and the solution, on cooling, solidifies to a crystal mass of a new compound $Al(C_6H_5)_3NaF$ or $[Al(C_6H_5)_3]_2NaF$ according to the quantitative proportions chosen.

The new compounds are intended primarily for use as catalysts in the polymerisation of olefines.

We claim:

1. A new complex compound having the formula:

$[Al(R_2R')]_xMeF$ in which R represents a member selected from the group consisting of lower alkyl and phenyl radicals, R' represents a member selected from the group consisting of lower alkyl and phenyl radicals and hydrogen, Me represents an alkyl metal and $x$ is a whole number from 1 to 2.

2. A new complex compound having the formula:

$[Al(R_2R')]MeF$ in which R represents a member selected from the group consisting of lower alkyl and phenyl radicals, R' represents a member selected from the group consisting of lower alkyl and phenyl radicals and hydrogen, and Me represents an alkali metal.

3. A new complex compound having the formula:

$[Al(R_2R')]_2MeF$ in which R represents a member selected from the group consisting of lower alkyl and phenyl radicals, R' represents a member selected from the group consisting of lower alkyl and phenyl radicals and hydrogen, and Me represents an alkali metal.

4. A mixture of a complex compound having the formula:

$[Al(R_2R')]MeF$ with a complex compound having the formula:

$[Al(R_2R')]_2MeF$ in which R represents a member selected from the group consisting of lower alkyl and phenyl radicals, R' represents a member selected from the group consisting of lower alkyl and phenyl radicals and hydrogen, and Me represents an alkali metal.

5. A new complex compound having the formula:

$Al(CH_3)_3MeF$ in which Me represents an alkali metal selected from the group consisting of sodium and potassium.

6. A new complex compound having the formula:

$Al(C_2H_5)_3MeF$ in which Me represents an alkali metal selected from the group consisting of sodium and potassium, and having a melting point of 64°–65° C. when Me represents sodium and 56°–58° C. when Me represents potassium.

7. A new complex compound having the formula:

$[Al(C_2H_5)_3]_2MeF$ in which Me represents an alkali metal selected from the group consisting of sodium and potassium, said compound being liquid and difficult to dissolve in aliphatic hydrocarbons and aluminium triethyl but miscible with many aromatic hydrocarbons when Me represents sodium and having a melting point of 127°–129° C. when Me represents potassium.

8. The complex compound of the formula:

$Al(C_3H_7)_3NaF$ having a melting point of 55° C.

9. The complex compound of the formula:

$Al(C_4H_9)_3NaF$ having a melting point between 40–50° C.

10. Process for the production of complex compounds which comprises reacting an aluminum hydrocarbon having the formula:

$AlR_2R'$ in which R is a member selected from the group consisting of lower alkyl and phenyl radicals and R' is a member selected from the group consisting of lower alkyl and phenyl radicals and hydrogen with an alkali fluoride, and recovering the complex compound formed.

11. Process according to claim 10 in which said reacting is effected by grinding said aluminum hydrocarbon with said alkali fluoride in a neutral solvent with the exclusion of air.

12. Process according to claim 11 in which said aluminum hydrocarbon is aluminum trimethyl, said neutral solvent is a hydrocarbon, said grinding is effected in a ball mill, and in which said recovered complex compound is alkali aluminum trimethyl fluoride having the formula:

$Al(CH_3)_3MeF$ where Me represents an alkali metal.

13. Process according to claim 10 in which said aluminum hydrocarbon is in the form of a molecular compound with a member selected from the group consisting of ethers, thioethers and tertiary amines.

14. Process for the production of complex compounds which comprises heating 1 mole of an aluminum hydrocarbon having the formula:

$$AlR_2R'$$

in which R is a member selected from the group consisting of lower alkyl and phenyl radicals and R' is a member selected from the group consisting of lower alkyl and phenyl radicals and hydrogen with 1 mole of an alkali fluoride with exclusion of air, and recovering the complex compound formed.

15. Process for the production of complex compounds which comprises heating 2 moles of an aluminum hydrocarbon having the formula:

$$AlR_2R'$$

in which R is a member selected from the group consisting of lower alkyl and phenyl radicals and R' is a member selected from the group consisting of lower alkyl and phenyl radicals and hydrogen with 1 mole of an alkali fluoride with exclusion of air, and recovering the complex compound formed.

16. Process for producing mixtures of complex compounds which comprises heating more than 1 and less than 2 moles of an aluminum hydrocarbon of the general formula:

$$AlR_2R'$$

in which R is a member selected from the group consisting of lower alkyl and phenyl radicals and R' is a member selected from the group consisting of lower alkyl and phenyl radicals and hydrogen with 1 mole of an alkali fluoride with exclusion of air, and recovering the mixture of complex compounds formed.

References Cited in the file of this patent

Davidson et al.: J. Am. Chem. Soc., vol. 64, pp. 316–324 (1942).